2,979,381
PROCESS FOR PRODUCING ZEOLITE X

Joseph G. Gottstine, Buffalo, and Emery H. Westerland, Tonawanda, N.Y., assignors to Union Carbide Corporation, a corporation of New York No Drawing. Filed Dec. 1, 1958, Ser. No. 777,219

9 Claims. (Cl. 23—113)

This invention relates to a process for producing a synthetic crystalline zeolite. More particularly, the invention relates to an improved process for producing zeolite X.

Zeolite X is a synthetic, crystalline aluminosilicate which may be represented by the formula $$0.9 \pm 0.2 \frac{M_2O}{n} : Al_2O_3 : 2.5 \pm 0.5 SiO_2 : YH_2O$$

wherein M represents a metal, particularly alkali and alkaline earth metals, $n$ is the valence of M, and Y may have any value up to about 8, depending on the identity of M and the degree of hydration of the crystalline zeolite.

All forms of zeolite X have an X-ray powder diffraction pattern characterized by at least those reflections set forth in Table I below.

TABLE I
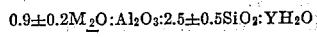

| $d$ Values of reflection in $A$. |
|---|
| 14.42±0.2 |
| 8.82±0.1 |
| 4.41±0.05 |
| 3.80±0.05 |
| 3.33±0.05 |
| 2.88±0.05 |
| 2.79±0.05 |
| 2.66±0.05 |

A preferred form of zeolite X is sodium zeolite X. A typical, fully hydrated sodium zeolite X composition may be represented by the formula $$0.9Na_2O : Al_2O_3 : 2.5SiO_2 : 6.1H_2O$$

Zeolite X, its properties, and methods for its preparation are described in detail in copending application Serial No. 400,389, filed December 24, 1953, now U.S. Patent 2,882,244.

Heretofore, two processes for preparing zeolite X have been described. According to one of these processes, described in detail in copending application Serial No. 400,389, sodium zeolite X may be prepared by combining (preferably at room temperature and with stirring) a water solution of sodium aluminate and sodium hydroxide with a water solution of sodium silicate. The resulting system is stirred until homogeneous and is then heated to about 212° F. Agitation may then be discontinued, since it is not necessary to agitate while the reactant mixture is allowed to crystallize at the elevated temperature. Although this process gives good yields of high purity zeolite X when carried out on a laboratory scale, the synthesis of larger batches by this method is complicated by less favorable heat-transfer characteristics. The resultant slow and uneven heating causes formation of a product containing appreciable quantities of non-crystalline materials. The use of agitation to increase the heating rate causes formation of undesirable species of crystalline zeolites.

The second of these processes is suitable, although not 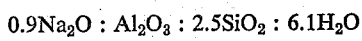 completely satisfactory, for large scale production of sodium zeolite X. This process consists of (1) rapidly mixing two preheated (212° F.) equal-volume reactant solutions together in a mix pump, one solution containing sodium silicate, the other sodium aluminate and sodium hydroxide, and (2) discharging the resulting mixture into a preheated digestion kettle where crystallization was completed by continued digestion at 212° F. for a minimum of six hours. This process will be referred to hereinafter as the hot mix process and is described in detail in copending application Serial No. 516,778, filed June 20, 1955. In order to obtain a good yield of pure product by the hot mix process, mixing time, mixing temperature and the amount of agitation after initial mixing must be very carefully controlled. Otherwise the product would be contaminated with undesirable crystalline zeolitic species. Even the agitation which resulted from passing the reaction mixtures through piping in the processing equipment was sufficient to produce substantial quantities of crystalline impurities.

It is the principal object of this invention to provide a process for producing zeolite X which is not subject to the disadvantages described hereinabove.

Another object of this invention is to provide a process for producing zeolite X in which a minimum of undesirable side product formation results from agitation during and after heating of the reaction mixture.

A further object of this invention is to provide a process which produces zeolite X having uniformly high purity.

Broadly stated, the improved process of this invention comprises the steps of (1) preparing a reactant mixture, from which at least some zeolite X may be crystallized by adding all the raw materials to a mix tank at ambient temperature, (2) allowing the resulting mixture to equilibrate or digest at ambient temperature for at least about two hours, (3) heating the mixture to an elevated temperature and (4) maintaining the reaction mixture at the elevated temperature until the zeolite X has crystallized. Ambient temperature, as used herein, means the air temperature normally encountered in a plant designed for production of zeolite X, namely temperatures in the range from about 55° F. to about 100° F.

As previously stated, zeolite X reactant mixtures made by the hot mixing procedure are sensitive to agitation both during and after the initial mixing at 212° F. Allowing a cold mixed reactant mixture to digest at ambient temperature according to the process of this invention greatly reduces this sensitivity. In fact, it is reduced to the point where the reactant mixture can be transferred through process piping without the formation of crystalline impurities or other contaminating substances.

The effect of ambient temperature digestion on crystalline impurity formation may be demonstrated by comparing two products made by the same procedure, except that one reactant mixture was allowed to digest at ambient temperature while the other was not given this digestion treatment. The product of the equilibrated or digested reactant mixture (16 hours) was extremely pure and fully crystallized after 3 hours of second-step crystallization at 212° F.; that prepared from an untreated (second-step crystallization only) reactant mixture contained considerable amounts of two different crystalline impurities.

The effectiveness of the two-step digestion treatments of this invention may also be demonstrated by an experiment in which a slow heatup of reactant mixtures with agitation was used. It is known that when sodium zeolite X reactant mixture which were cold-mixed but otherwise untreated, that is, there is no ambient temperature digestion, are heated up slowly to crystallization temperature with agitation, copious quantities of crystalline impurities are formed. However, where a cold reactant mixture was digested for 16 hours at ambient temperature prior to slow heatup with agitation, the product contained relatively small quantities of crystalline impurities.

When using the hot mix procedure, a minimum of 6 hours and usually longer is required to fully crystallize a zeolite X reactant mixture. Using the two-step digestion procedure of this invention, the second-step crystallization time can be reduced to 3 hours for a mixture digested for 2 to 16 hours and to 1.5 hours for a reactant mixture digested 9 days. This reduction in second-step crystallization time is important where a continuous-synthesis, large-scale process is employed.

In the hot-mix procedure as heretofore practiced, two equal-volume solutions are prepared separately, one containing sodium silicate and water and the other sodium aluminate, caustic and water. The two-step procedure of this invention eliminates separate mixing of the principal ingredients, thereby eliminating the need for two preparation tanks. Mixing of the reactant mixture can now be accomplished in one tank. Also, in the hot mix procedure the reactant solutions have to be metered together at a rate consistent with the oxide mole ratios desired in the final reactant mixture. In the improved process, however, such proportional metering of the reactants is not necessary; consequently, less attention is required in the initial preparation of reaction mixtures and the chances of error in the proportional metering step are eliminated.

In comparing the hot-mix technique with the improved two-step procedure, distinct differences in the nature of the product are apparent. The zeolite X crystals from a two-step preparation are of uniformly higher purity. This may be demonstrated by X-ray diffraction analysis and by the higher adsorption capacity of the zeolite X made by the improved process of this invention.

A preferred method for carrying out the process of this invention will now be described. The operable limits of the process will be discussed in more detail following the description of this preferred procedure for preparing sodium zeolite X.

The quantities of ingredients required for the desired oxide mole ratios in the initial reactant composition are determined. A preferred reactant mixture has about the following composition expressed in terms of oxide mol ratios:

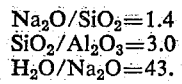

$Na_2O/SiO_2 = 1.4$
$SiO_2/Al_2O_3 = 3.0$
$H_2O/Na_2O = 43.$

All of the required water for the batch is placed in the mix tank. All of the required caustic (sodium hydroxide) is dissolved in this water with agitation. After the sodium hydroxide is completely dissolved, the required sodium aluminate is added and completely dissolved with agitation. The resulting solution is usually allowed to return to ambient temperature.

Next, the required amount of commercial grade sodium silicate is added slowly, with agitation, so that the solids as formed are continually broken up and no large chunks of solid material are visible in the tank. This reactant mixture is agitated for about 20 minutes and is then allowed to digest quiescently at ambient temperature for 3 to 16 hours. Agitation during this step is not harmful.

While keeping the reactant mixture agitated, it is rapidly heated by employing a heat exchanger, or other suitable means, and is introduced into a crystallization vessel. The temperature in the crystallization vessel is maintained to give a mixture temperature of about 200°–212° F. The mixture is not agitated after it is charged to the crystallization vessel.

The reactant mixture is then maintained at 200–212° F. until sodium zeolite X crystallizes. Convenient crystallization times are in the range from about 1.5 hours to 8 hours, and the preferred range is from about 3 hours to 6 hours. At the completion of crystallization, the solids are separated from the liquor by filtration, and the crystals are washed and dried according to the standard procedures.

This preferred embodiment may be illustrated by the following examples:

EXAMPLE I

A 60 pound batch of reactant mixture having the composition in terms of oxide mole ratios

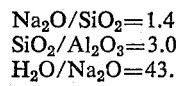

$Na_2O/SiO_2 = 1.4$
$SiO_2/Al_2O_3 = 3.0$
$H_2O/Na_2O = 43.$ was prepared according to the following procedure: Sodium hydroxide flakes (76 wt.-percent Na₂O, 1100 grams) and 1575 grams of sodium aluminate were dissolved in 17,000 grams of water. To this solution (cooled to about room temperature) was added a solution made up of 4560 grams of sodium silicate, 167.9 grams of the same type sodium hydroxide flakes and 2890 grams of water. The resulting mixture was agitated throughout mixing and for 30 minutes thereafter.

The above mixture was allowed to digest without agitation overnight (16 hours) at ambient temperature. This mixture was then passed through a heat exchanger at the rate of 0.37 gallon per minute. The temperature of the mixture discharging from the heat exchanger was 195° F. Samples were taken from the mixture at the discharge end and allowed to crystallize at about 212° F. for periods ranging from 3 to 8 hours.

After crystallization was complete, the solids were separated from the mother liquor by filtration. After washing, drying and activating, the purity of the crystalline product from each of the runs was determined. Activating, as used herein, means treating the zeolite X to remove the water of hydration. A suitable activation process is heating the zeolite X to about 350° C. under vacuum. Activated zeolite X contains less than about 2 weight-percent water and preferably less than one weight-percent water. Measurements showed the major product in each case to be sodium zeolite X, with only trace amounts of other crystalline zeolites and other impurities.

EXAMPLE II

An 8-gallon batch having the oxide ratios:

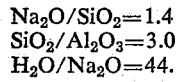

$Na_2O/SiO_2 = 1.4$
$SiO_2/Al_2O_3 = 3.0$
$H_2O/Na_2O = 44.$ was prepared as follows: Flake caustic (NaOH, 1268 grams) was dissolved in 20,250 milliliters of water. Sodium aluminate (1575 grams) was dissolved in the caustic solution. Sodium silicate (4560 grams) was then added slowly and the solution was agitated for 30 minutes after this addition. The resulting mixture was digested quiescently at ambient temperature for 16 hours. Next, the mixture was heated rapidly to 200°–205° F. by passing through a heat exchanger and into a preheated jacketed reaction kettle. Samples of the heated mixture, crystallized at 200°–205° F. for times ranging from one hour to eight hours, were taken. Crystallized samples were allowed to cool and given the filtering, washing and drying treatment. These samples were analyzed for purity by X-ray and CO₂ adsorption capacity measurements. Analysis showed that reactant mixtures maintained at the elevated temperature of the second step for three to eight hours, inclusive, gave zeolite X products of high purity, with only trace amounts of one or two contaminating zeolitic species. The CO₂ adsorption capacities of these products after activation ranged from 22.8 to 24.5 weight-percent at 250 mm. carbon dioxide pressure and a temperature of 25° C.

In addition to the preferred procedure set forth above, the operable limits and process variables may be described as follows:

The range of reactant mixture compositions for use in the process of this invention, expressed in terms of oxide mole ratios, is about as follows:

$$Na_2O/SiO_2 = 1.2-1.5$$
$$SiO_2/Al_2O_3 = 2.5-5.0$$
$$H_2O/Na_2O = 35-60$$

In addition to sodium silicate, silicic acid and other materials such as colloidal silica sols may be used as the source of silica.

The preferred order of addition of raw materials is to add the silicate solution to the aluminate solution. The reason for this preference is that the aluminate solution, which consists of all the required water, the sodium aluminate and caustic (sodium hydroxide) may be prepared first; the silicate solution, which may be used as purchased, is then added. This allows the reactant mixture to be made up in a single mix tank.

When the preferred order of addition was reversed by adding the aluminate solution to the silicate solution, there was no noticeable effect of this reversal on the product; however, difficulty was encountered in dispersing the solids in the reactant mixture which occur at the point of addition of the aluminate solution.

Ambient temperature, that is, about 55° F. to 100° F., is the preferred mixing temperature although higher or lower temperatures are operable. For example, a mixing temperature of 158° F. produced a satisfactory product comparable to that made with ambient temperature mixing, while a mixing temperature of 43° F. gave a product containing only small amounts of a crystalline impurity. In neither case was any advantage observed over a product made by a mixing operation conducted at ambient temperature.

The ambient temperature digestion period may vary from about 2 hours up to about 9 days. Periods of between 2 and 16 hours consistently produced a pure product; periods below 2 hours produced erratic results. Thus, a minimum of 2 hours is required for first-step digestion in order to obtain a pure product from the overall process.

It was found that first-step digestion times ranging from 2 to 16 hours have virtually no effect on the minimum second-step crystallization time. (Minimum crystallization time refers to the time required to produce a zeolite X product that will adsorb a minimum of 21 weight-percent carbon dioxide at 250 mm. gas pressure and 25° C.) However, when the first-step digestion time exceeded about 16 hours, up to and including 9 days, the duration of the minimum second-step crystallization time was progressively reduced from 3 hours (for a reactant mixture pre-digested from 2 to 16 hours) to 1.5 hours (for a reactant mixture predigested 9 days). Thus, a minimum crystallization time of about 1.5 hours is required. First-step digestion times up to about 9 days have no deleterious effects on the final product; however, first-step digestion times beyond about 9 days resulted in a product having slightly decreased adsorption capacity.

Agitation may be used during the first-step digestion periods for 2 to 16 hours with little or no effect on second-step crystallization time or product purity. In addition, agitation during first-step digestion reduces the number of large crystal agglomerates formed during the second (crystallization) step.

Several methods of rapidly heating the predigested reactant mixture may be successfully employed. For example, the digested mixture may be passed through a steam-heated heat exchanger. Also, the reactant mixture may be rapidly heated by injecting steam directly into a stream of the digested mixture as it is pumped to the crystallization vessel. In this method the water in the initial reactant mixture is reduced so that the water added as steam will not increase the water content of the final reactant mixture above the desired amount.

Practical crystallization (second step) temperature limits may vary from about 185° F. to about 250° F. The preferred temperature range, as previously stated, is 200°–212° F. Second-step crystallization temperatures below about 185° F. considerably increase the length of time required to complete the crystallization. Second-step crystallization temperatures above about 250° F. decrease the crystallization time, but the operating latitude between the maximum and minimum second-step crystallization time is considerably reduced. (Minimum crystallization time is defined hereinabove; maximum crystallization time is defined as the longest time that the reaction mixture can be maintained at crystallization temperature without seriously contaminating the zeolite X product with crystalline and non-crystalline zeolites.) For example, at about 335° F. the minimum crystallization time is 1.5 hours while the maximum crystallization time is less than 3 hours. Such reduction in operating latitude is undesirable because it requires constant and closer production control. A product made at about 212° F. was in no way superior to that made at 200° F.–205° F. Prolonged crystallization times in the second step, especially at temperatures above about 250° F. may at least partly convert the zeolite X into contaminating crystalline and non-crystalline species. The preferred crystallization time at 200–212° F. is between about 3 and 6 hours; high purity products are produced and adequate operating latitude in the process is obtained.

What is claimed is:

1. An improved process for the production of sodium zeolite X which comprises: (1) preparing at about ambient temperature a reactant mixture having the composition expressed in terms of oxide mole ratios about as follows:

$$Na_2O/SiO_2 = 1.2-1.5$$
$$SiO_2/Al_2O_3 = 2.5-5.0$$
$$H_2O/Na_2O = 35-60$$

(2) maintaining said reactant mixture at about ambient temperature for at least about two hours; (3) heating said reactant mixture to an elevated temperature; and (4) maintaining said reactant mixture at said elevated temperature until sodium zeolite X has crystallized.

2. An improved process for the production of sodium zeolite X which comprises: (1) preparing at about ambient temperature a reactant mixture having the composition expressed in terms of oxide mole ratios about as follows:

$$Na_2O/SiO_2 = 1.2-1.5$$
$$SiO_2/Al_2O_3 = 2.5-5.0$$
$$H_2O/Na_2O = 35-60$$

(2) maintaining said reactant mixture at about ambient temperature for at least about two hours, (3) heating said reactant mixture to an elevated temperature between about 185° F. and about 250° F.; and (4) maintaining said reactant mixture at said elevated temperature for at least 1.5 hours to crystallize said sodium zeolite X.

3. Process in accordance with claim 2 wherein said reaction mixture is agitated during preparation at ambient temperature.

4. Process in accordance with claim 2 wherein said reactant mixture is maintained at said elevated temperature without agitation.

5. Process in accordance with claim 2 wherein said reactant mixture is maintained at about ambient temperature for from about two hours to about 9 days.

6. Process in accordance with claim 2 wherein said elevated temperature is in the range from about 200° F. to about 212° F.

7. Process in accordance with claim 2 wherein said reactant mixture is maintained at said elevated temperature for between about 1.5 and about 8 hours.

8. An improved process for the production of sodium zeolite X which comprises: (1) preparing at about ambient temperature a reactant mixture having the composition expressed in terms of oxide mole ratios about as follows:

$$Na_2O/SiO_2 = 1.4$$
$$SiO_2/Al_2O_3 = 3.0$$
$$H_2O/Na_2O = 43$$

(2) maintaining said reactant mixture at about ambient temperature for between about 3 hours and about 16 hours; (3) rapidly heating said reactant mixture to about 212° F.; and (4) maintaining said reaction mixture without agitation at about 212° F. for at least 1.5 hours to crystallize sodium zeolite X.

9. Process in accordance with claim 8 wherein said reactant mixture is rapidly heated to between about 200° F. and about 212° F. and wherein said reactant mixture is maintained without agitation at between about 200° F. and about 212° F. for between about 3 hours and about 6 hours.

References Cited in the file of this patent
UNITED STATES PATENTS
2,882,244   Milton _____ Apr. 14, 1959